Aug. 29, 1967  R. N. SCOTT  3,338,070

CONSTANT VELOCITY UNIVERSAL JOINT

Filed Jan. 17, 1966

INVENTOR.
Robert N. Scott
BY
Herbert Furman
ATTORNEY

United States Patent Office 3,338,070
Patented Aug. 29, 1967

3,338,070
CONSTANT VELOCITY UNIVERSAL JOINT
Robert N. Scott, Saginaw, Mich., assignor to General Motors Corporation, Detroit, Mich., a corporation of Delaware
Filed Jan. 17, 1966, Ser. No. 520,950
6 Claims. (Cl. 64—21)

This invention relates generally to universal joints and more specifically to a crossed groove type constant velocity universal joint.

One feature of this invention is that each race has four grooves having axes that are similarly skewed with respect to the race axis. Another feature of this invention is that the groove axes of one race are symmetrical to the groove axes of the other race about a plane normal to the coincident race axes upon joint alignment. A further feature of this invention is that the skewed groove arrangement maintains proper race relationship and positions the torque transmitting balls in the homokinetic plane without the assistance of a cage or spider.

Further features of this invention will become apparent upon reference to the following specification and the attached drawings in which.

Figure 1:
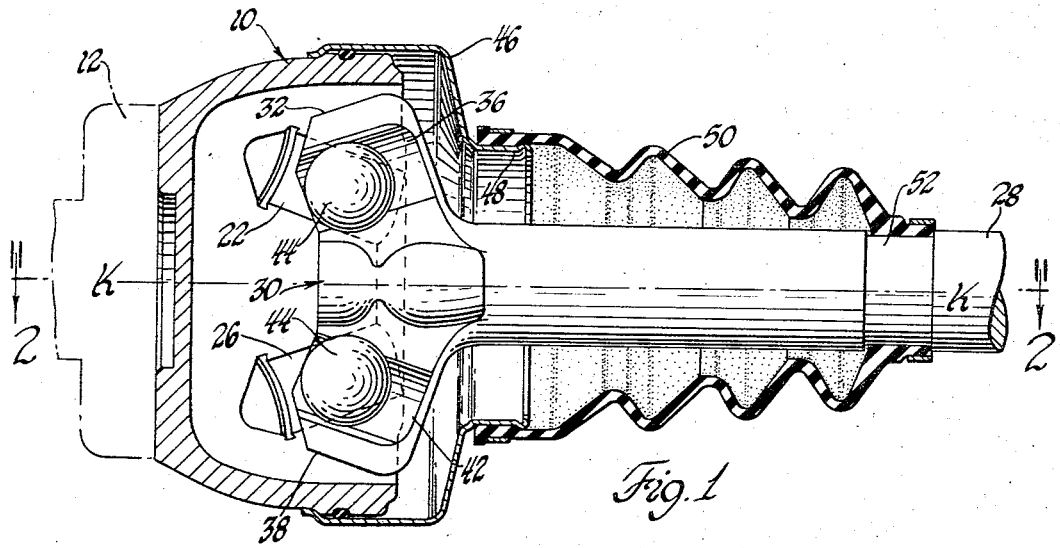
FIGURE 1 is a partially broken away elevational view of a universal joint according to this invention.
Figure 3:
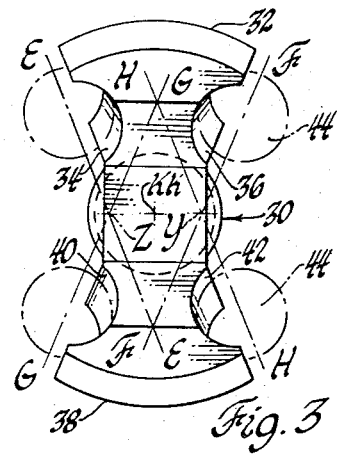
FIGURE 3 is an end view of the inner race of the universal joint.
Figure 2:
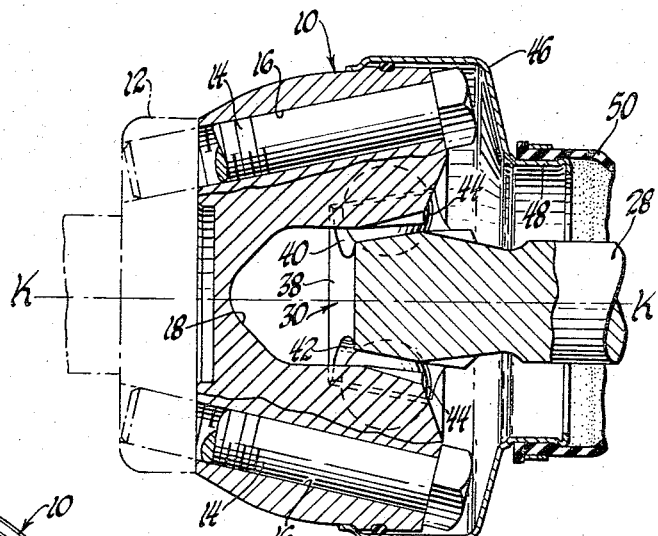
FIGURE 2 is a sectional view taken generally on the plane indicated by line 2—2 of FIGURE 1.
Figure 4:
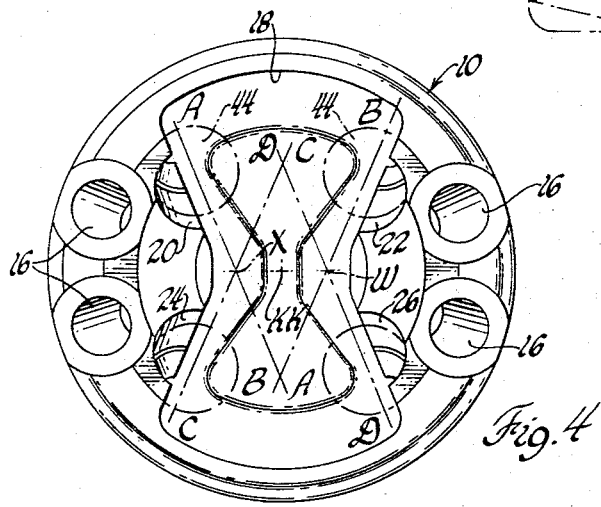
FIGURE 4 is an end view of the outer race of the universal joint.

Referring now to the drawings, the universal joint includes an outer race 10 which is connected to a flanged shaft 12 by four bolts 14, FIGURE 2, which are received through four angled holes 16 in the outer race. As best seen in FIGURE 4, outer race 10 includes an hour glass shaped cavity 18 having a pair of upper angled grooves 20 and 22, with respective axes A—A and B—B, and a pair of lower angled grooves 24 and 26, with respective axes C—C and D—D. As best seen in FIGURE 3, a shaft 28 includes an inner race 30 having an upper wedge portion 32 provided with a pair of angled grooves 34 and 36 having respective axes E—E and F—F, and a lower wedge portion 38, provided with a pair of angled grooves 40 and 42 having respective axes G—G and H—H. As best shown in FIGURE 1, race 30 is received within cavity 18 of race 10 so that grooves 20, 22, 24 and 26 are crossed with respect to grooves 34, 36, 40 and 42 to form corresponding pairs of crossed grooves which position torque transmitting members or balls 44 at their intersections.

The universal joint is shown in aligned position in which line K—K represents the coincident axes of both races. The arrangement of the outer race grooves with respect to axis K—K is best seen in FIGURE 4. Axes B—B and D—D are skewed with respect to axis K—K and intersect at a point W spaced from K—K. These axes define a plane B—W—D angled with respect to K—K. Axes A—A and C—C are similarly skewed with respect to K—K and intersect at a spaced point X. These axes also define a plane A—X—C angled equally with plane B—W—D to K—K but oppositely therefrom. Opposed axes A—A and D—D are mutually skewed, as are axes B—B and C—C. The grooves have a symmetrical relationship such that, if A—A and B—B were rotated 180° about K—K, they would coincide with D—D and C—C, respectively, and A—A and B—B are symmetrical to C—C and D—D, respectively, about a plane through K—K, X and W.

As shown in FIGURE 3, the inner race grooves are similarly arranged. Axes F—F and H—H are skewed with respect to K—K and intersect at a point Y spaced from K—K, thus defining angled plane F—Y—H. Axes E—E and G—G are similarly skewed with respect to K—K, intersecting at a spaced point Z, thus defining an equally and oppositely angled plane E—Z—G. Opposed axes E—E and H—H are mutually skewed as are axes F—F and G—G. The inner race grooves have the same symmetrical relationship as do the outer race grooves such that, if E—E and F—F were rotated 180° about K—K, they would coincide with H—H and G—G, respectively, and E—E and F—F are symmetrical to G—G and H—H, respectively, about a plane through K—K, Y and Z.

The groove axes of race 10 are symmetrical to the groove axes of race 30 about the homokinetic plane such that, if race 10 were axially reversed, the axes of both races would coincide, as would the points of intersection. By this symmetrical skewed groove arrangement, the balls confined by corresponding groove pairs 22, 34 and 26, 40 move in a plane that is not parallel with axis K—K or with the plane of movement of the balls confined in groove pairs 20, 36 and 24, 42 upon angulation and axial movement of the joint. Since the grooves are symmetrically crossed with respect to each other, the balls 44 are constrained to move in the homokinetic plane. Since adjacent balls do not move in parallel planes, the races are maintained in proper relationship and are prevented from radial disorientation. In previous universal joints this desirable two-fold result has been attained only by the use of an additional spider, cage or centering ball, or by mating spherical surfaces on the inner and outer races.

The groove arrangement described above and shown in the drawings additionally provides that the balls confined at the intersection of opposite groove pairs such as 22, 34 and 24, 42 do not move in the same plane or in parallel planes. The illustrated structure provides great radial strength of the joint and reduces the shearing stresses put on the balls by radial forces. Previous universal joints have been designed with the groove axes intersecting the member axes at a common point. By such an arrangement opposed balls would move in a common plane, thus diminishing the radial strength of the joint and creating large shearing stresses on the balls due to radial forces.

A further advantage is obtained by the particular skewed groove axis arrangement of this joint. As shown in FIGURE 3, adjacent groove axes E—E and F—F of upper wedge 32 intersect at a point on the opposite side of K—K from grooves 34 and 36, forming a relatively small angle with respect to each other. The small angle of mutual intersection provides additional strength for wedge 32 between grooves 34 and 36. However, corresponding crossed grooves, such as 36 and 20, maintain a relatively large angle of crossing, permitting larger joint angles without displacing balls from the homokinetic plane via coincidence of corresponding groove axes.

To properly seal the universal joint, a conventional dust cover 46 is clamped to outer race 10. Dust cover 46 has a neck 48 which clampingly receives one end of a conventional rubber boot 50 that is clamped in an annular groove 52 in shaft 28.

While only a preferred embodiment is shown and described, many modifications are possible without departing from the scope of this invention. Although each race preferably has four grooves, any equal number of grooves, such as six or eight, will effect the desired result.

I claim:

1. A constant velocity universal joint comprising a first race, a second race, each race having a plurality of circumferentially spaced grooves, the grooves being arranged in corresponding pairs, each groove being crossed with respect to its corresponding groove in the other race and each groove having its axis skewed with respect to its respective race axis, the axis of adjacent grooves of each race intersecting at points spaced from the respective race axis, and a plurality of torque transmitting members positioned at the intersections of the corresponding crossed grooves.

2. The constant velocity universal joint of claim 1 in which the grooves of the first race are symmetrical to the grooves of the second race about the homokinetic plane.

3. The constant velocity universal joint of claim 1 wherein each race has four grooves, and the axes of an adjacent pair of grooves of each race are symmetrical to the axes of the other pair of grooves of the respective race about the respective race axis.

4. The constant velocity universal joint of claim 2 wherein each race has four grooves, the point of intersection of the axes of one pair of adjacent grooves of each race and the point of intersection of the axes of the other pair of adjacent grooves of the respective race being equally spaced from the respective race axis.

5. The constant velocity universal joint of claim 2 wherein each race has four grooves, the axis of each groove of each race being skewed with respect to the axis of the nonadjacent groove of its respective race.

6. The constant velocity universal joint of claim 2 wherein the axis of each groove of each race intersects the axis of one adjacent groove of its respective race at a first point lying on the same side of the respective race axis as the respective grooves and the said axis of each groove of one race intersects the axis of another adjacent groove of its respective race at a second point lying on the side of the respective race axis opposite from the respective grooves.

References Cited

UNITED STATES PATENTS

| | | | |
|---|---|---|---|
| 2,737,790 | 3/1956 | Bellomo | 64—21 |
| 3,002,364 | 10/1961 | Bellomo | 64—21 |
| 3,045,456 | 7/1962 | Bellomo | 64—21 |
| 3,133,431 | 5/1964 | Zech | 64—21 |
| 3,296,834 | 1/1967 | Gravel | 64—21 |
| 3,298,200 | 1/1967 | Altmann et al. | 64—21 |

FOREIGN PATENTS 1,357,053  2/1964  France.

FRED C. MATTERN, JR., *Primary Examiner.*

H. C. COE, *Assistant Examiner.*